(12) United States Patent
Prabha et al.

(10) Patent No.: US 10,163,062 B2
(45) Date of Patent: Dec. 25, 2018

(54) METHODS AND SYSTEMS FOR PREDICTING ERRONEOUS BEHAVIOR OF AN ENERGY ASSET USING FOURIER BASED CLUSTERING TECHNIQUE

(71) Applicant: CARRIER CORPORATION, Jupiter, FL (US)

(72) Inventors: Baburaj Kaimalilputhenpura Prabha, Calicut (IN); Joy Banerjee, Durgapur (IN)

(73) Assignee: CARRIER CORPORATION, Jupiter, FL (US)

( * ) Notice: Subject to any disclaimer, the term of this patent is extended or adjusted under 35 U.S.C. 154(b) by 589 days.

(21) Appl. No.: 14/746,535

(22) Filed: Jun. 22, 2015

(65) Prior Publication Data

US 2016/0267387 A1 Sep. 15, 2016

(30) Foreign Application Priority Data

Mar. 13, 2015 (IN) .......................... 1270/CHE/2015

(51) Int. Cl.
*G06N 99/00* (2010.01)
*G06K 9/00* (2006.01)

(52) U.S. Cl.
CPC ....... *G06N 99/005* (2013.01); *G06K 9/00523* (2013.01)

(58) Field of Classification Search
CPC combination set(s) only.
See application file for complete search history.

(56) References Cited

U.S. PATENT DOCUMENTS 7,711,734 B2 * 5/2010 Leonard ................. G06Q 30/02
  707/736
8,639,338 B2 * 1/2014 Rogers .............. A61M 5/14276
  607/29

(Continued)

FOREIGN PATENT DOCUMENTS

WO WO 2014-145977 9/2014

OTHER PUBLICATIONS

A Virtual Smart Grid, Real-Time Simulation for Smart Grid Control and Communications Design, by David Anderson, Chuanlin Zhao, Carl H. Hauser, Vaithianathan Venkatasubramanian, David E. Bakken, and Anjan Bose, 2012 1540-7977/12/$31.00 © 2012 IEEE power & energy magazine.*

(Continued)

*Primary Examiner* — Michael B Holmes
(74) *Attorney, Agent, or Firm* — Cantor Colburn LLP

(57) ABSTRACT

This disclosure relates generally to predicting health of an energy asset, and more particularly to methods and systems for predicting erroneous behavior of an energy asset using fourier based clustering technique. In one embodiment, a method for determining predicting erroneous behavior of an energy asset is disclosed. The method includes creating one or more energy signatures by performing frequency domain analysis on historical energy data and subsequent clustering of the energy signatures. Further, live energy data is filtered to generate filtered outputs wherein each of the filtered outputs is mapped to a respective cluster. The outlier cluster is identified to predict the erroneous behavior of the energy asset.

14 Claims, 5 Drawing Sheets

(56) References Cited

U.S. PATENT DOCUMENTS

| | | | |
|---|---|---|---|
| 8,706,421 B2* | 4/2014 | Jojic | G06F 19/16 702/19 |
| 8,812,808 B2* | 8/2014 | Eyerman | G06F 1/3203 711/167 |
| 8,825,567 B2 | 9/2014 | Jiang et al. | |
| 8,961,763 B2* | 2/2015 | Dunbar | G01N 33/48721 204/451 |
| 9,110,461 B2* | 8/2015 | Morisawa | G05B 19/4184 |
| 9,189,485 B2* | 11/2015 | Suzuki | G05B 23/0264 |
| 9,696,277 B2* | 7/2017 | Dunbar | G01N 33/48721 |
| 9,863,912 B2* | 1/2018 | Dunbar | G01N 33/48721 |
| 2010/0185414 A1* | 7/2010 | Yamamoto | B60W 50/0205 702/183 |
| 2013/0097128 A1* | 4/2013 | Suzuki | G05B 23/0264 707/693 |
| 2013/0233709 A1* | 9/2013 | Dunbar | G01N 33/48721 204/451 |
| 2014/0099726 A1* | 4/2014 | Heller | G01N 33/48721 436/94 |
| 2014/0318964 A1* | 10/2014 | Dunbar | G01N 33/48721 204/451 |
| 2015/0160160 A1* | 6/2015 | Dunbar | G01N 33/48721 204/452 |
| 2016/0267387 A1* | 9/2016 | Prabha | G06N 99/005 |
| 2017/0030728 A1* | 2/2017 | Baglino | G01C 21/3469 |
| 2017/0269034 A1* | 9/2017 | Dunbar | G01N 33/48721 |

OTHER PUBLICATIONS

Elsevier Annals of Nuclear Energy vol. 38, Issues 2-3, Feb.-Mar. 2011, pp. 665-680 Wireless sensors for predictive maintenance of rotating equipment in research reactors H.M Hashemian.*

Elsevier Renewable Energy vol. 45, Sep. 2012, pp. 86-95 Wind turbine performance assessment using multi-regime modeling approach Edzel Lapira, Dustin Brisset, Hossein Davari Ardakani, David Siegel, Jay Lee.*

Elsevier Procedia CIRP vol. 3, 2012, pp. 221-226 On a Predictive Maintenance Platform for Production Systems K. Efthymiou, N. Papakostas, D. Mourtzis, G. Chryssolouris.*

Elsevier Mechanical Systems and Signal Processing vols. 60-61, Aug. 2015, pp. 252-272 A summary of fault modelling and predictive health monitoring of rolling element bearings Idriss El-Thalji, Erkki Jantunen.*

* cited by examiner

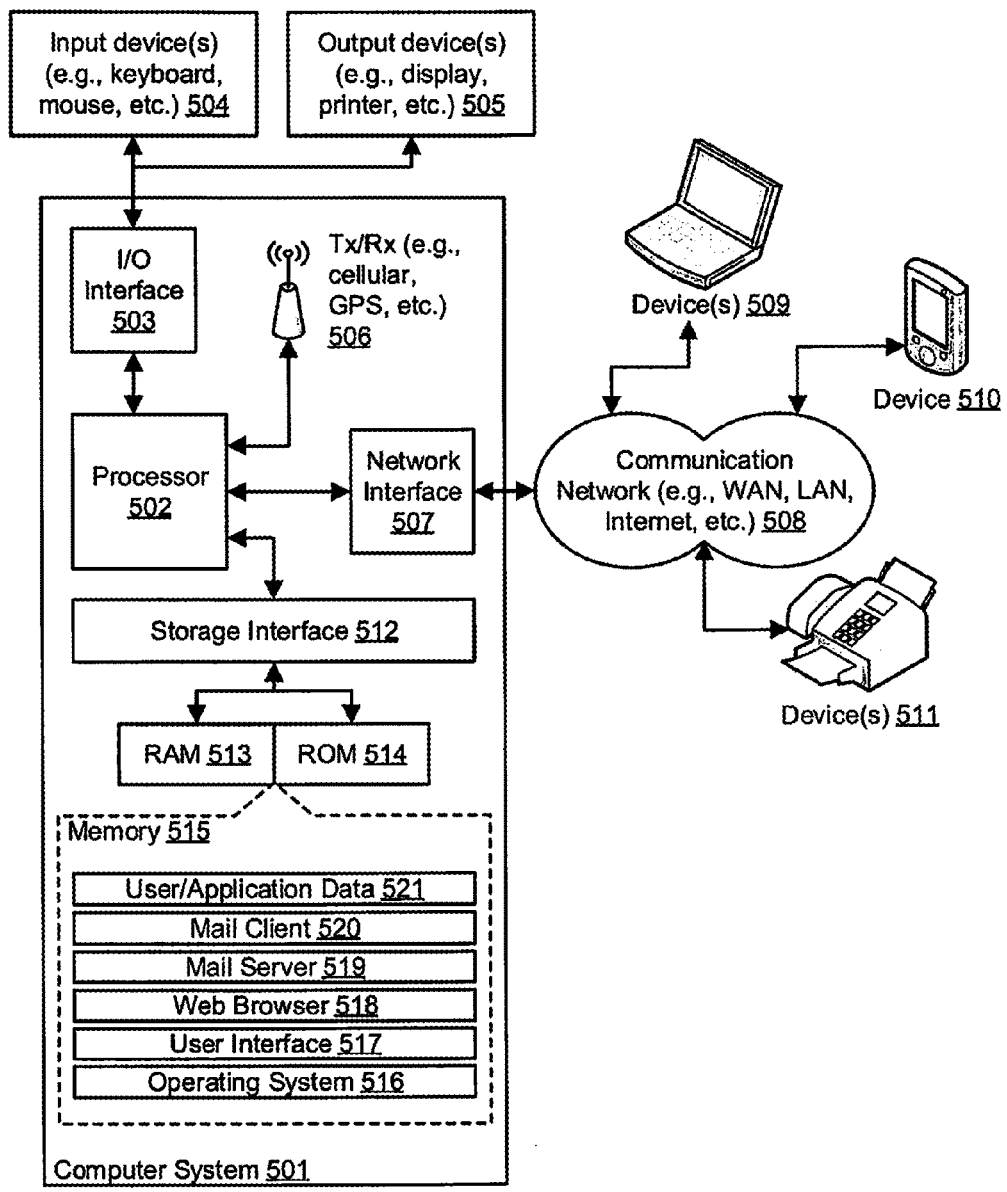
FIG. 5: Example Computer System

METHODS AND SYSTEMS FOR PREDICTING ERRONEOUS BEHAVIOR OF AN ENERGY ASSET USING FOURIER BASED CLUSTERING TECHNIQUE

PRIORITY CLAIM

This U.S. patent application claims priority under 35 U.S.C. § 119 to: India Application No. 1270/CHE/2015, filed on Mar. 13, 2015. The aforementioned application is incorporated herein by reference in its entirety.

TECHNICAL FIELD

This disclosure relates generally to predicting health of an energy asset, and more particularly to methods and systems for predicting erroneous behavior of an energy asset using Fourier based clustering technique.

BACKGROUND

Complex energy asset such as air conditioner (AC), lighting, and kitchen require regular maintenance to ensure that the energy assets continue to function properly. Often, critical components of these energy assets are more susceptible to failure than other components. In current scenario, earlier detection of energy asset health is not possible except wear & tear. The maintenance of the energy assets will be performed in defined interval. However there is a chance that the energy assets condition would have deteriorated due to extensive usage like coil windings damage & results in magnetic flux linkage & thereby increase in energy consumption. In the case of AC there is a chance that subsystems would have gone bad and the AC may not be able to work effectively. This may get unnoticed and results in higher/lower energy consumption. The failure of the energy assets lead to financial implication in terms of time, effort and production.

However, in current practice in hospitality sector it is difficult to detect outlier of asset such as AC, Lighting, and kitchen asset proactively. In view of the above, earlier detection of asset health is not possible. Therefore, there is need for system and method for predicting the erroneous behavior of the asset.

In view of the above drawbacks, it would be desirable to have methods and systems for predicting erroneous behavior of an energy asset using fourier based clustering technique.

SUMMARY

Disclosed herein is a method for predicting anomaly associated with at least one energy asset. The method includes receiving, by a processor, time stamped historical energy data associated with the at least one asset; creating, by the processor, one or more frequency components by performing frequency domain analysis on the time stamped historical energy data, each of the one or more frequency components indicative of time stamped energy values associated with the at least one energy asset; clustering, by the processor, the one or more frequency components to generate one or more clusters based on similarity of time stamped energy value, each of the one or more clusters associated with at least one energy signature, the at least one energy signature being average of time stamped energy values for a cluster; receiving time stamped energy data in real time from the at least one energy asset; comparing, by the processor, between the time stamped energy data and the at least one energy signature associated with a cluster; identifying, by the processor, the cluster comprising outlier data based on the comparison to predict anomaly associated with the at least one energy asset.

In an aspect of the present disclosure, a system for predicting anomaly associated with at least one energy asset is disclosed. The system may comprise one a processor and a memory storing instructions, that when executed by the processor, causes the processor to perform operations. The operations may include receiving, by a processor, time stamped historical energy data associated with the at least one asset; creating, by the processor, one or more frequency components by performing frequency domain analysis on the time stamped historical energy data, each of the one or more frequency components indicative of time stamped energy values associated with the at least one energy asset; clustering, by the processor, the one or more frequency components to generate one or more clusters based on similarity of time stamped energy value, each of the one or more clusters associated with at least one energy signature, the at least one energy signature being average of time stamped energy values for a cluster; receiving time stamped energy data in real time from the at least one energy asset; comparing, by the processor, between the time stamped energy data and the at least one energy signature associated with a cluster; identifying, by the processor, the cluster comprising outlier data based on the comparison to predict anomaly associated with the at least one energy asset.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 5 is a block diagram of an exemplary computer system for implementing embodiments consistent with the present disclosure.

DETAILED DESCRIPTION

Figure 1:
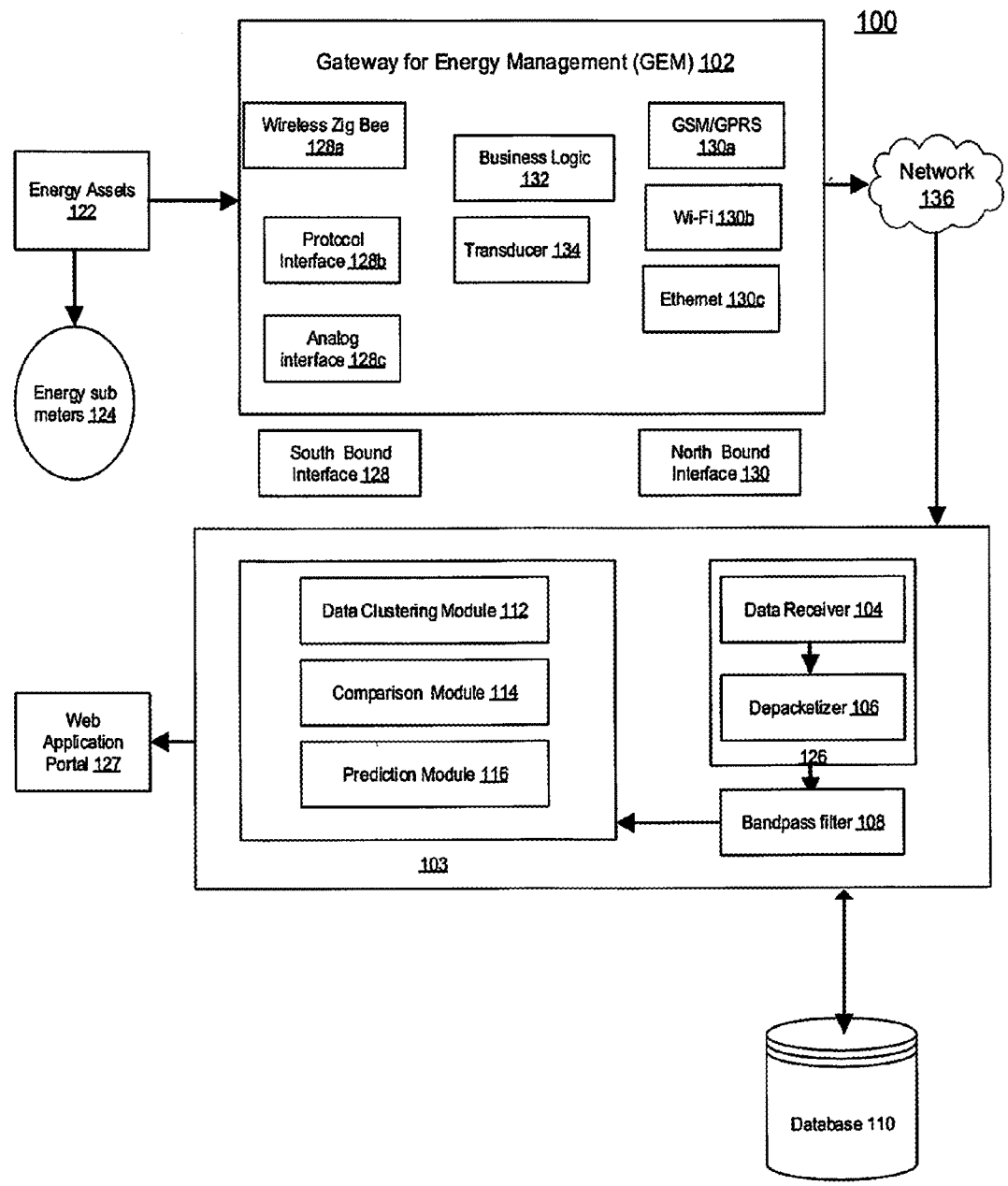
FIG. 1 is architecture of a system for predicting erroneous behavior of an energy asset using fourier based clustering technique in accordance with some embodiments of the present disclosure.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

In the present disclosure, the word "exemplary" is used herein to mean "serving as an example, instance, or illustration." Any embodiment or implementation of the present disclosure described herein as "exemplary" is not necessarily to be construed as preferred or advantageous over other embodiments.

While the present disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 is architecture of a system 100 for predicting the erroneous behavior of an energy asset using fourier based clustering technique in accordance with some embodiments of the present disclosure. The system 100 comprises a gateway for energy management (GEM) 102 and a processor 103. The processor 103 further comprises a data receiver 104, a depacketizer 106, a bandpass filter 108, a database 110, a data clustering module 112, a comparison module 114, and a prediction module 116. The processor 103 is communicatively coupled to the database 110. The database 110 stores historical data related to the energy consumption by the energy assets 122. The GEM 102 is communicatively coupled to the energy assets 122 that are further coupled to the energy sub meters 124 that measure the consumption of energy data associated with the energy assets 122. The consumption of energy data is being communicated by the energy sub meters to the GEM 102. Also, the GEM 102 receives parameters from the energy assets 122. The parameters are stamped energy data. The parameters may include energy consumed by the energy assets 122. The data receiver 104 and the depacketizer 106 may constitute part of the data acquisition module 126. Also, the processor 103 may be connected to a web application portal 127.

The energy assets 122 may be one or more power meters, one or more drives, one or more motors, one or more capacitor banks, one or more air compressors, one or more refrigerator units, one or more turbines, one or more generators, one or more energy storage devices, one or more photovoltaic cells, one or more robots, one or more reactors, or any combinations thereof.

The GEM 102 may comprise south bound interface 128 and north bound interface 130. The south bound interface 128 may be hardware interface, software interface, or a combination thereof. The south bound interface 128 may comprise a wireless Zig Bee 128a, protocol interface 128b, and analog interface 128c. The north bound interface 130 may comprise a GSM/GPRS 130a, Wi-Fi 130b, and Ethernet 130c. Besides the south bound interface 128 and the north bound interface 130, there is business logic 132 and transducer 134. The business logic pertains to a plurality of conditions. In an exemplary embodiment, there may be a condition that data may be acquired from each of the energy assets in different time slots and each of the time slots may be separated from the other time slot, for example, by 2 minutes.

The south bound interface 128 receives the time stamped energy data from the energy assets 122 and communicates it to the processor 103 through the north bound interface (It transmits the data onto different medium like Ethernet, Wi-Fi and GPRS) 130 and a network (Its the medium via which the data will be transferred in the form of packets) 136. In the processor 103, it is the data acquisition module 126 that receives the time stamped energy data and depacketize it.

The data receiver 104 accepts the time stamped energy data via the network 136 from all the energy assets 122 through different internet protocols. In an exemplary embodiment, the protocol may be TCP/IP protocol. The depacketizer 106 may translate encrypted data in the form of packets to user readable format and stores the data in the database 110. The depacketized data from the depacketizer 106 is passed through the band pass filter 108 that filters the depacketized data to generate one or more outputs. In an exemplary embodiments, apart from the bandpass filter 108, low pass and high pass filters may be used. The band pass filter 108 is adapted to filter the time stamped energy data within a certain range and rejects the time stamped energy data outside the certain range. In an exemplary embodiment, the filters may be digital filters. In yet another exemplary embodiment, the filters may not be there and the depacketized data is sent directly to the data clustering module 112.

Time stamped historical energy data associated with the at least one energy asset is fetched from the database 110 by the data clustering module 112.

The data clustering module 112 generates one or more frequency components by performing frequency domain analysis on the time stamped historical energy data, each of the one or more frequency components indicative of time stamped energy values associated with the at least one energy asset;

Further, the data clustering module 112 clusters the one or more frequency components to generate one or more clusters based on similarity of time stamped energy values. Each of the one or more clusters is associated with at least one energy signature. In an exemplary embodiment, the at least one energy signature is average of time stamped energy values for a cluster. The one or more energy signatures are indicative of the state/health of the energy assets 122. The state/health of the energy assets 122 may be normal working of the energy asset 122, the energy asset 122 on the verge of malfunctioning, the energy asset actually malfunctioning.

Further, the comparison module 114 compare the time stamped energy data and the at least one energy signature associated with a cluster. In an exemplary embodiment, the comparison module 114 computes the Euclidean distance between the time stamped energy data and the at least one energy signature associated with the cluster. Based on the least Euclidean distance, the comparison module 114 maps the time stamped energy data to the cluster.

The comparison module 114 identifies the cluster comprising outlier data based on the comparison to predict anomaly associated with the at least one energy asset. The prediction module 116 predicts the anomaly associated with the energy asset 122 based on the identification of cluster having outlier data.

Further, the data clustering module 112 enable the grouping of similar energy profiles from time stamped energy data which is characterized by the state of the system. The said system state can have various operation modes along with faulty system mode. The frequency components generated leveraging Fourier transform, will be passed to the data clustering module 112.

According to some embodiments of the present disclosure, the filters the time stamped energy data to generate one or more outputs. The data clustering module 112 computes the euclidian distance between filter outputs and cluster signature. This is an iterative process for all outputs from the band pass filter 108. The one having least score would be mapped to the respective cluster. If the Euclidian distance computed in above steps are same, then the cluster having least difference in low pass filter output is selected.

Each cluster signature is characterized by asset's state of the system, operational efficiency and throughput. The outlier cluster will signify the faulty state of the system. The prediction module 116 predicts the faulty state of the energy asset 122 based on the identification of the outlier cluster identified by the comparison module 114.

Furthermore, the prediction module 116 is adapted to send a notification to the user of the energy asset 122 informing him of the current state of health and also predicting the possible defects that may occur in the near future. The web portal 127 enables the user to know about the state of the energy asset 122.

For example, a filtered output is mapped to a cluster that is indicative of the malfunctioning of the energy asset, i.e. outlier cluster, then the output indicates a faulty state of the system. Therefore, in this condition, corrective measures need to be taken to restore the health of the energy asset 122.

The present disclosure has several advantages such as reduction of time and effort of the user, predicting erroneous behavior of the energy asset 122 with very limited parameters, prevention of energy asset failure in future, and increasing the productivity of the user.

Figure 2:
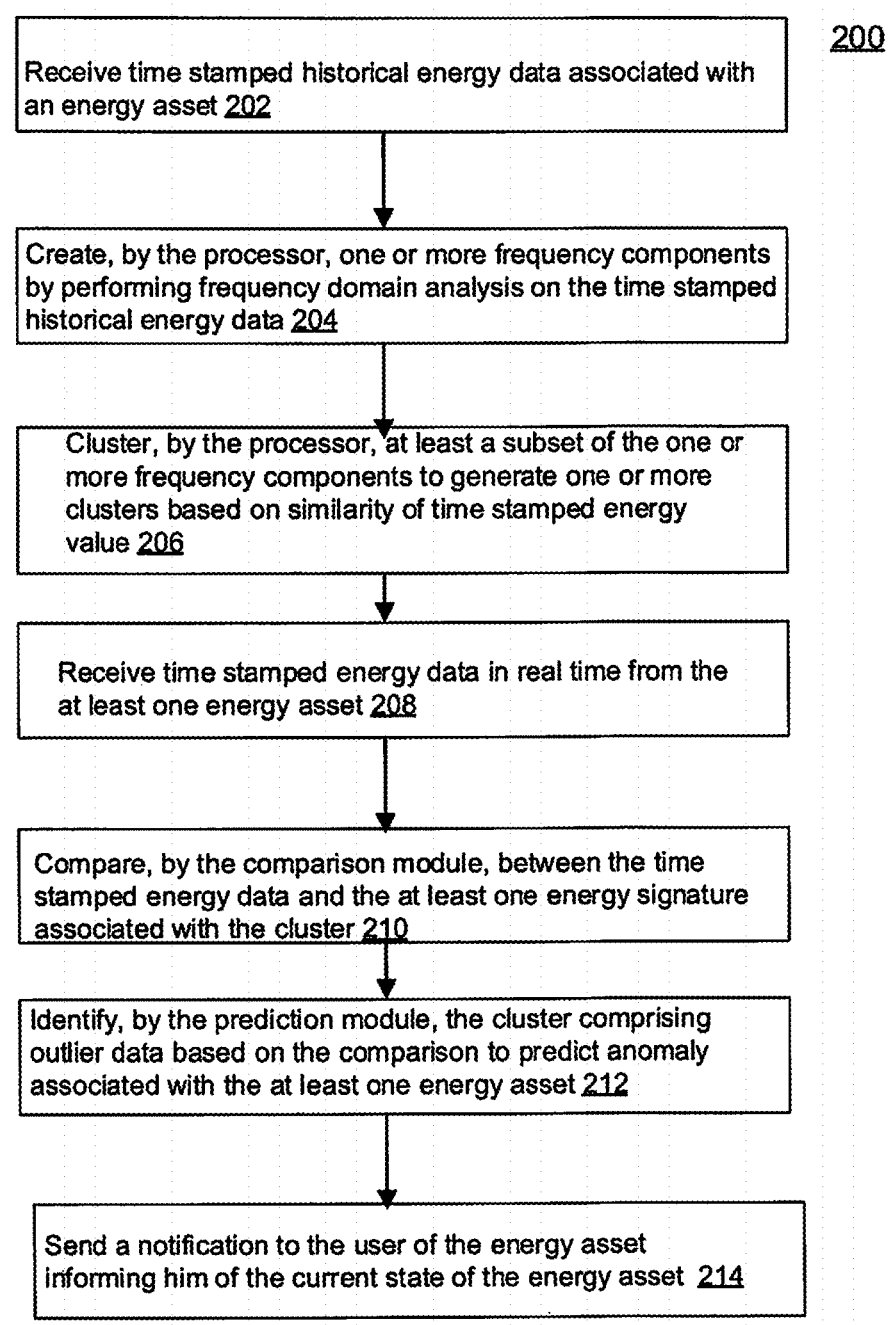
FIG. 2 is a flowchart 200 of a method for predicting the erroneous behavior of an energy asset using fourier based clustering technique in accordance with some embodiments of the present disclosure.

FIG. 2 is a flowchart 200 of a method for predicting the erroneous behavior of an energy asset using fourier based clustering technique in accordance with some embodiments of the present disclosure.

At step 202, receive time stamped historical energy data associated with an energy asset 122. The time stamped historical energy data may be fetched from the database 110. The energy assets 122 may be one or more power meters, one or more drives, one or more motors, one or more capacitor banks, one or more air compressors, one or more refrigerator units, one or more turbines, one or more generators, one or more energy storage devices, one or more photovoltaic cells, one or more robots, one or more reactors, or any combinations thereof.

At step 204, create, by the processor, one or more frequency components by performing frequency domain analysis on the time stamped historical energy data. Each of the one or more frequency components is indicative of time stamped energy values associated with the at least one energy asset;

At step 206, cluster, by the processor, the one or more frequency components to generate one or more clusters based on similarity of time stamped energy values. Each of the one or more clusters is associated with at least one energy signature, wherein the at least one energy signature is average of time stamped energy values for a cluster. Each of the energy signature is characterized by the stat/health of the energy asset 122.

At step 208, receive time stamped energy data in real time from the at least one energy asset 122.

At step 210, compare, by the comparison module 114, between the time stamped energy data and the at least one energy signature associated with the cluster. In an exemplary embodiment, the comparison module 114 computes the Euclidean distance between the time stamped energy data and the at least one energy signature associated with the cluster. Based on the least Euclidean distance, the comparison maps the time stamped energy data to the cluster.

At step 212, identify, by the prediction module 116, the cluster comprising outlier data based on the comparison to predict anomaly associated with the at least one energy asset. Each energy signature is characterized by asset's state of the system, operational efficiency and throughput. The one or more energy signatures are indicative of the state/health of the energy assets 122. The state/health of the energy assets 122 may be normal working of the energy asset 122, the energy asset 122 on the verge of malfunctioning, the energy asset actually malfunctioning. The outlier cluster will signify the faulty state of the energy asset 122.

Furthermore, at step 214, send a notification to the user of the energy asset 122 informing him of the current state of the energy asset 122 and also predicting the possible defects that may occur in the near future. The web portal 127 enables the user to know about the state of the energy asset 122.

Figure 3:
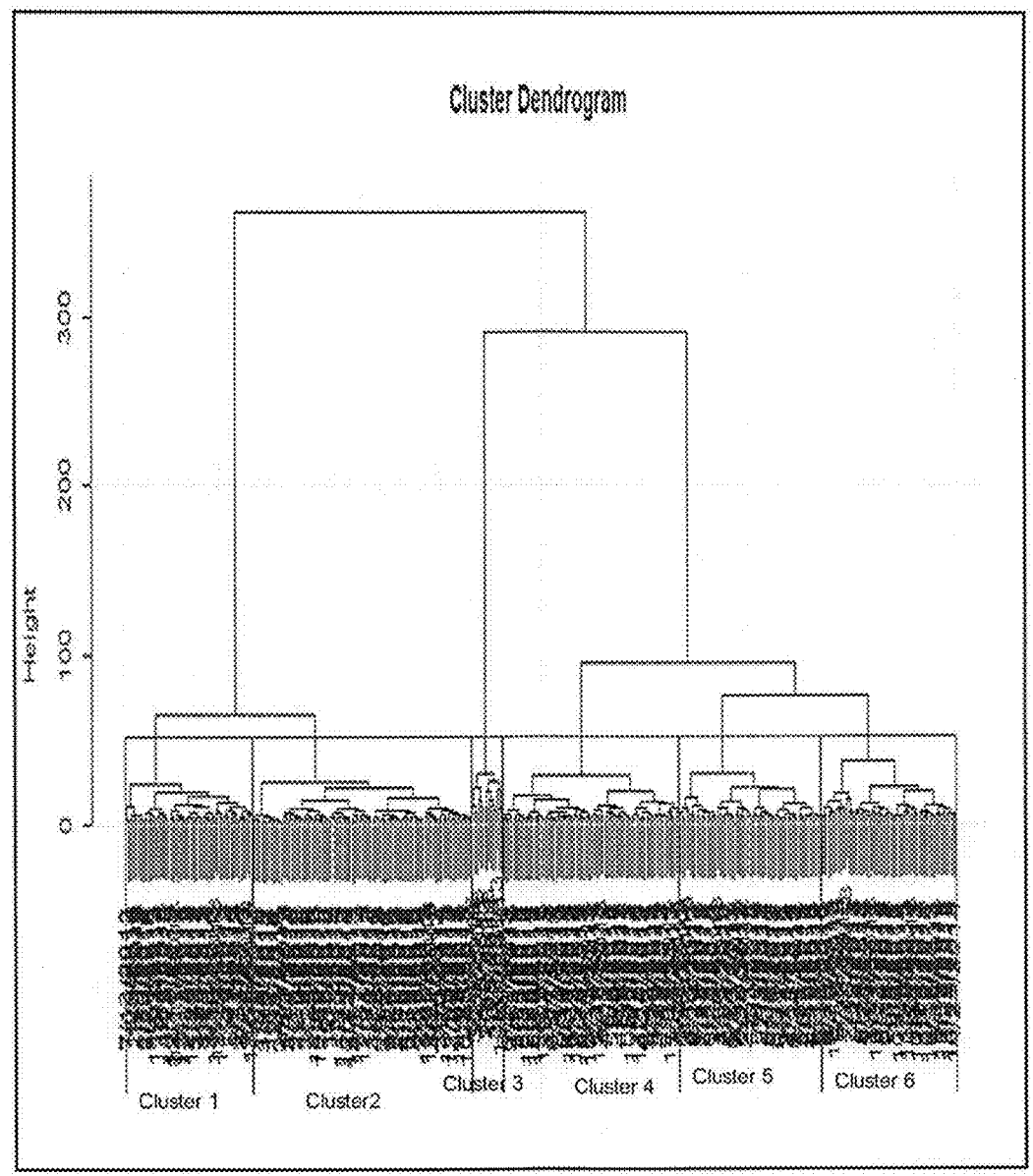
FIG. 3 illustrates generating of one or more clusters based on the similarity of energy signatures.

FIG. 3 illustrates generating of one or more clusters based on the similarity of energy profiles. There are many clustering techniques available. One of which may be unsupervised hierarchal clustering technique. The one or more clusters are generated by clustering of the one or more frequency components that are generated by the fourier transform of the time stamped historical energy data stored in the database 122.

Figure 4:
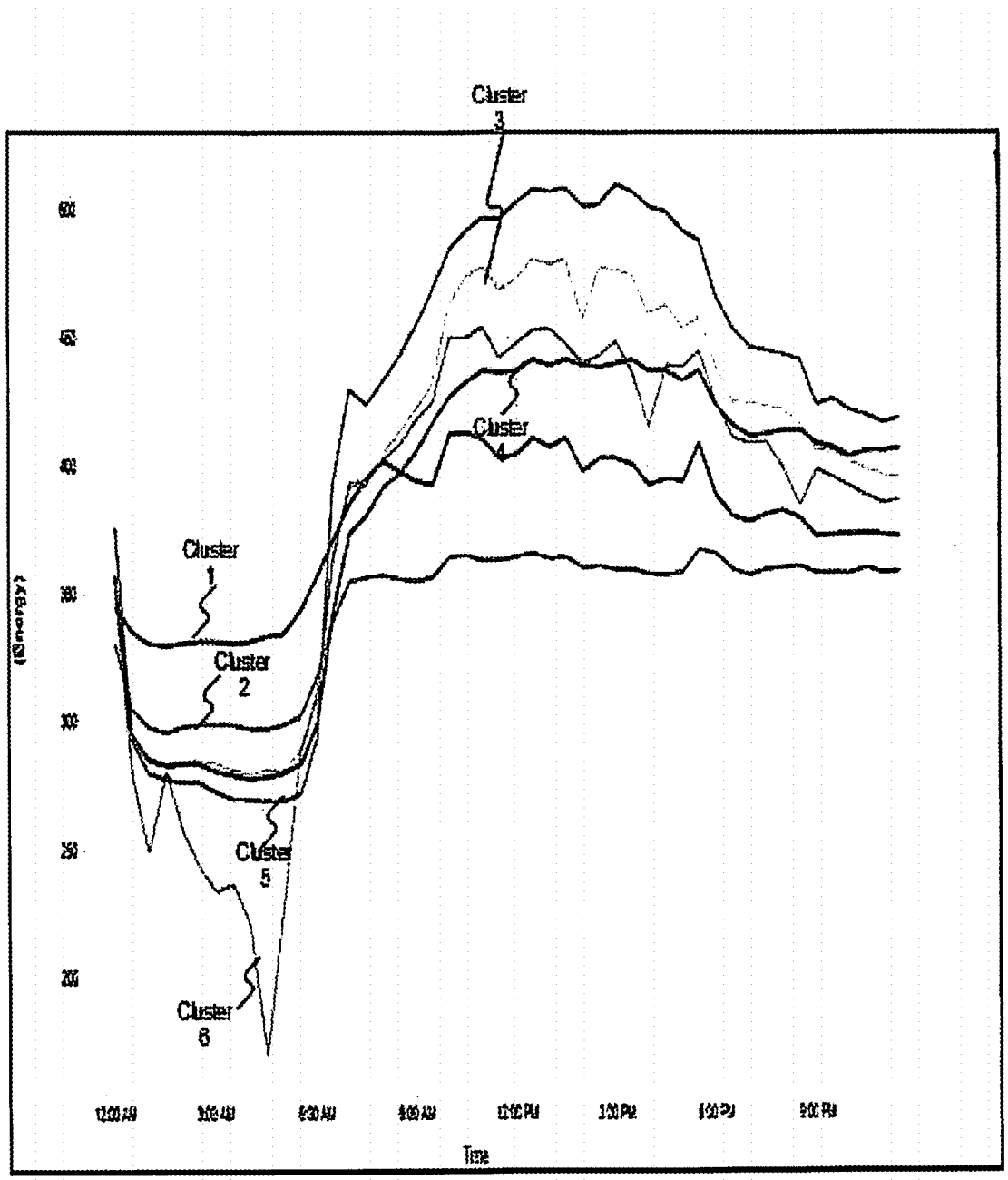
FIG. 4 illustrates identification of the outlier cluster in accordance with some embodiments of the present disclosure.

FIG. 4 illustrates identification of the outlier cluster in accordance with some embodiments of the present disclosure. Shown in the FIG. 4 are 6 graphs showing the pattern of energy consumption associated with the energy asset 122. Each of the graphs correspond to a particular cluster. The outlier cluster 6 typically contains the data that falls outside the clusters or which cannot be fit into any of the clusters generated in FIG. 3 that helps to predict the possible defects that may occur in the future. Clusters 1-5 are the ones that indicate normal working state of the energy asset 122 based on different scenario. Cluster 6 is the outlier where the erroneous behavior of the energy asset 122 is identified.

Computer System

FIG. 5 is a block diagram of an exemplary computer system for implementing embodiments consistent with the present disclosure. Variations of computer system 501 may be used for implementing processor the 103, GEM 102. Computer system may comprise a central processing unit ("CPU" or "processor") may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor may be disposed in communication with one or more input/output (I/O) devices via I/O interface. The I/O interface may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface, the computer system may communicate with one or more I/O devices. For example, the input device may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device may be a printer, fax machine, video display (e.g., cathode ray tube (CRT), liquid crystal display (LCD), light-emitting diode (LED), plasma, or the like), audio speaker, etc. In some embodiments, a transceiver may be disposed in connection with the processor. The transceiver may facilitate various types of wireless transmission or reception. For example, the transceiver may include an antenna operatively connected to a transceiver chip (e.g., Texas Instruments WiLink WL 1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor may be disposed in communication with a communication network via a network interface. The network interface may communicate with the communication network. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network {e.g., using Wireless Application Protocol), the Internet, etc. Using the network interface and the communication network, the computer system may communicate with devices. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system may itself embody one or more of these devices.

In some embodiments, the processor may be disposed in communication with one or more memory devices {e.g., RAM, etc.) via a storage interface. The one or more memory devices may be used for implementing variations of the database 110. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system interface application, web browser, mail server, mail client, user/application data (e.g., any data variables or data records discussed in this disclosure), etc. The operating system may facilitate resource management and operation of the computer system. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface may facilitate display, execution, interaction, manipulation, or operation of program components through textual or graphical facilities. For example, user interfaces may provide computer interaction interface elements on a display system operatively connected to the computer system, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system may implement a web browser stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system may implement a mail client stored program component. The mail client may be a mail viewing application, such as Apple Mail, Microsoft Entourage, Microsoft Outlook, Mozilla Thunderbird, etc.

In some embodiments, computer system may store user/application data, such as the data, variables, records, etc. (e.g., energy consumption associated with an energy asset 122, filtered output, clusters) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for predicting anomaly associated with at least one energy asset via a system that includes a processor comprising a data receiver, a depacketizer and a band pass filter, the method comprising:
    receiving, by the data receiver of the processor, time stamped historical energy data associated with the at least one energy asset;
    creating, by the processor, one or more frequency components by performing frequency domain analysis on the time stamped historical energy data, each of the one or more frequency components indicative of time stamped energy values associated with the at least one energy asset;
    clustering, by the processor, the one or more frequency components to generate one or more clusters based on similarity of time stamped energy values, each of the one or more clusters associated with at least one energy signature, the at least one energy signature being average of time stamped energy values for a cluster;
    receiving, by the data receiver of the processor, time stamped energy data in real time from the at least one energy asset over a network, wherein the time stamped energy data is received in a data packet format comprising encrypted data;
    translating, by the depacketizer of the processor, the encrypted data from the packet format to a user readable format to generate depacketized data comprising the time stamped energy in the user reasonable format;
    filtering, by the band filter of the processor, the depacketized data to filter the time stamped energy data within a predetermined range, wherein band pass filter is configured to reject the time stamped energy data that is outside the predetermined range;
    comparing, by the processor, between the filtered time stamped energy data and the at least one energy signature associated with a cluster; and
    identifying, by the processor, the cluster comprising outlier data based on the comparison to predict anomaly associated with the at least one energy asset.

2. The method of claim 1, wherein each of the one or more clusters is associated with at least one operating state of the at least one energy asset.

3. The method of claim 2, wherein the at least one operating state comprise at least one of a: normal working of the at least one energy asset, the energy asset on verge of malfunctioning, and actual malfunctioning of the at least one energy asset.

4. The method of claim 1, wherein the at least one energy asset comprise one or more power meters, one or more drives, one or more motors, one or more capacitor banks, one or more air compressors, one or more refrigerator units, one or more turbines, one or more generators, one or more energy storage devices, one or more photovoltaic cells, one or more robots, one or more reactors, or any combinations thereof.

5. The method of claim 1, further comprising notifying a user about the predicted anomaly associated with the at least one energy asset.

6. The method of claim 1, wherein comparing, by the processor, between the filtered time stamped energy data and the at least one energy signature comprises:
    computing Euclidean distance between the filtered time stamped energy data and the at least one energy signature.

7. The method of claim 6, wherein the time stamped energy data having least Euclidean distance between the filtered time stamped energy data and the at least one energy signature is mapped to the cluster associated with the at least one energy signature.

8. A system for predicting anomaly associated with at least one energy asset, the system comprising:
    a processor comprising a data receiver, a depacketizer, and a band pass filter; and
    a memory storing instructions that when executed by the processor, causes the processor to perform operations comprising:

receiving, by the data receiver of the processor, time stamped historical energy data associated with the at least one asset;

creating, by the processor, one or more frequency components by performing frequency domain analysis on the time stamped historical energy data, each of the one or more frequency components indicative of time stamped energy values associated with the at least one energy asset;

clustering, by the processor, the one or more frequency components to generate one or more clusters based on similarity of time stamped energy values, each of the one or more clusters associated with at least one energy signature, the at least one energy signature being average of time stamped energy values for a cluster;

receiving, by the data receiver of the processor, time stamped energy data in real time from the at least one energy asset over a network, wherein the time stamped energy data is received in a data packet format comprising encrypted data;

translating, by the depacketizer of the processor, the encrypted data from the packet format to a user readable format to generate depacketized data comprising the time stamped energy in the user reasonable format;

filtering, by the band filter of the processor, the depacketized data to filter the time stamped energy data within a predetermined range, wherein band pass filter is configured to reject the time stamped energy data that is outside the predetermined range;

comparing, by the processor, between the filtered time stamped energy data and the at least one energy signature associated with a cluster; and identifying, by the processor, the cluster comprising outlier data based on the comparison to predict anomaly associated with the at least one energy asset.

9. The system of claim 8, wherein each of the one or more clusters is associated with at least one operating state of the at least one energy asset.

10. The system of claim 9, wherein the at least one operating state comprise at least one of a: normal working of the at least one energy asset, the energy asset on verge of malfunctioning, and actual malfunctioning of the at least one energy asset.

11. The system of claim 8, wherein the at least one energy asset comprise one or more power meters, one or more drives, one or more motors, one or more capacitor banks, one or more air compressors, one or more refrigerator units, one or more turbines, one or more generators, one or more energy storage devices, one or more photovoltaic cells, one or more robots, one or more reactors, or any combinations thereof.

12. The system of claim 8, further comprising notifying a user about the predicted anomaly associated with the at least one energy asset.

13. The system of claim 8, wherein comparing, by the processor, between the filtered time stamped energy data and the at least one energy signature comprises:
computing Euclidean distance between the filtered time stamped energy data and the at least one energy signature.

14. The system of claim 13, wherein the filtered time stamped energy data having least Euclidean distance between the time stamped energy data and the at least one energy signature is mapped to the cluster associated with the at least one energy signature.

* * * * *